(12) United States Patent
Altolaguirre López

(10) Patent No.: US 11,311,020 B2
(45) Date of Patent: Apr. 26, 2022

(54) STERILISATION PROCESS BY MEANS OF HEAT TREATMENT FOR PRESERVING THE INK OF COLEOID CEPHALOPOD MOLLUSCS

(71) Applicant: Nortindal Sea Products, S.L., Hernani (ES)

(72) Inventor: Eva María Altolaguirre López, Hernani (ES)

(73) Assignee: Nortindal Sea Products, S.L., Hernani (ES)

( * ) Notice: Subject to any disclaimer, the term of this patent is extended or adjusted under 35 U.S.C. 154(b) by 319 days.

(21) Appl. No.: 15/744,740

(22) PCT Filed: Nov. 21, 2016

(86) PCT No.: PCT/ES2016/070828
§ 371 (c)(1),
(2) Date: Jan. 12, 2018

(87) PCT Pub. No.: WO2018/091752
PCT Pub. Date: May 24, 2018

(65) Prior Publication Data
US 2019/0069567 A1 Mar. 7, 2019

(51) Int. Cl.
*A23B 4/005* (2006.01)
*A23L 17/50* (2016.01)
(Continued)

(52) U.S. Cl.
CPC .............. *A23B 4/005* (2013.01); *A23L 17/00* (2016.08); *A23L 17/50* (2016.08); *C09B 61/00* (2013.01)

(58) Field of Classification Search
CPC ......... A23B 4/005; A23L 17/00; A23L 17/50; C08J 2325/06; C08J 2325/18
See application file for complete search history.

(56) References Cited

U.S. PATENT DOCUMENTS 6,329,010 B1 12/2001 Marquinet
2007/0228005 A1* 10/2007 Hasegawa ............... C09B 61/00
216/58

FOREIGN PATENT DOCUMENTS

CN 102499389 A 6/2012
CN 102776238 A * 11/2012
(Continued)

OTHER PUBLICATIONS

Jose, EP0966888.*
(Continued)

*Primary Examiner* — Holly Kipouros
(74) *Attorney, Agent, or Firm* — Mark M. Friedman

(57) ABSTRACT

A sterilization process by means of heat treatment to preserve the ink of coleoid cephalopod molluscs includes the steps of homogenizing and first heat treating (1) the ink in a reactor for pasteurising treatment in which a temperature of at least 70° C. is attained for over 10 minutes; and cooling (2) the homogenized ink in a tank set to a temperature of below 30° C. and retaining the ink in the tank to lower its temperature. The process also includes the steps of continuing by filling, turning, blowing and marking (3) the expiry dates; and second heat treating (4) the ink in an autoclave in which a heat treatment is performed to achieve a sterilization temperature greater than or equal to 110° C. for a predetermined time based upon the quantity to be canned.

1 Claim, 1 Drawing Sheet

(51) Int. Cl.
    *A23L 17/00* (2016.01)
    *C09B 61/00* (2006.01)

(56) References Cited

FOREIGN PATENT DOCUMENTS

| | | | |
|---|---|---|---|
| CN | 106072437 | A | 11/2016 |
| EP | 0966888 | A1 | 12/1999 |
| JP | H01152162 | A | 6/1989 |
| JP | H059395 | A | 1/1993 |
| JP | 1997285275 | A | 11/1997 |
| JP | H09285275 | A | 11/1997 |
| KR | 20090023750 | A | 3/2009 |

OTHER PUBLICATIONS

Ellouze et al., Mediterranien cuttlefish sepia officinalis squid ink is cytotoxic but does not inhibit Glioblastoma U87 tumor cells proliferation, with high nutritional values of edible viscera, Mar. 2014, International Journal of Basic and Applied Sciences 3(2) (Year: 2014).*

Document entitled Description CN102776238A 10 Preparation method of squid ink natural melanin, English machine translation of CN102776238A provided by Espacenet (Year: 2015).*

Thermal Processing of Food. Article. May 6, 2015. 23 pages.

* cited by examiner

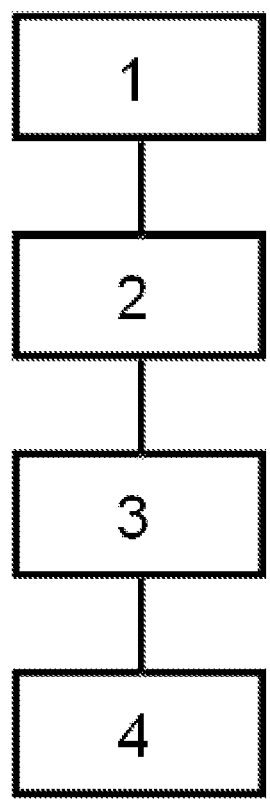

STERILISATION PROCESS BY MEANS OF HEAT TREATMENT FOR PRESERVING THE INK OF COLEOID CEPHALOPOD MOLLUSCS

OBJECT OF THE INVENTION

The object of the present invention, as established in the title of the invention, is a process of sterilisation by means of heat treatment for preserving the ink of coleoid cephalopod molluscs and in particular the ink of sepia and squid and all subspecies thereof.

The invention is characterised by the special characteristics of each of the stages in the process, which together ensure that there is no bacterial growth during the specified shelf life and best-before period and achieve a stable product that meets the preservation values of food quality regulations of all countries.

This invention therefore falls within of the area of sterilisation procedures for preservation.

BACKGROUND TO THE INVENTION

All cephalopods, with the exception of Nautilidae and octopuses of the suborder Cirrina, are capable of secreting a pigment, popularly known as ink. This ink is used in the preparation of certain dishes.

The ink of coleoid cephalopod molluscs is essentially made up of mucus and melanin. Melanin is the same pigment that produces dark skin, freckles and hair in humans and animals. Depending on the species, the ink may contain certain varieties of amino acids such as taurine, lysine, tyrosine and dopamine. The colour of the ink varies depending on the species and its chemistry; the ink of octopuses tends towards black, while squid ink is bluer and sepia ink browner.

Fish and shellfish preserves are prepared by canning the fish or shellfish to be preserved, which is then sterilised. Sterilisation, which is achieved by raising the food to high temperatures in the container, is essential for eliminating micro-organisms and germs. Airtight sealing of the container ensures that seafood thus preserved can be consumed in perfect condition long after it has been packed. If any anomaly is observed in the container, such as for example poor sealing or a small hole, the food is not suitable for consumption. Vacuum sealing is of key importance to preserving these foodstuffs and any alteration may be harmful.

To date pasteurising, but not sterilising procedures are known for canning and preserving the ink of coleoid cephalopod molluscs, since most are sold either fresh, etc. or frozen. If any attempt has been made to can and preserve the ink of coleoid cephalopod molluscs, it cannot have been successful, since no commercial process achieving preservation is known that complies with the food regulations of different countries.

The object of the present invention is therefore a procedure that allows the ink of cephalopods to be preserved in safe and sterile conditions for a time, allowing it to be used subsequently without health risks and with the appropriate organoleptic stability for culinary use.

DESCRIPTION OF THE INVENTION

The object of the present invention is a sterilisation process by means of heat treatment for the canning and preservation of the ink of coleoid cephalopod molluscs which enables it to be preserved and used later without risk to health, in compliance with the food safety regulations established in different countries.

Sterilisation refers to the process whereby a product is obtained that is free from viable micro-organisms. The sterilisation process must be designed, validated and performed in such a way as to ensure that it is capable of eliminating the microbial load of the product or a more resistant micro-organism.

Given that sterility cannot be absolutely demonstrated without causing the complete destruction of all units in a batch of finished product, sterility is defined in probabilistic terms, where the probability that a unit of the product is contaminated is deemed to be acceptably remote. A critical product is considered to be sterile when the probability of a micro-organism being present in active or latent form is less than or equal to 1 in 1,000,000 (i.e. a sterility assurance level of $10^{-6}$).

The procedure comprises the following stages:

Homogenisation and first heat treatment of the ink in a reactor to perform pasteurising treatment in which a temperature of at least 70° C. is attained for over 10 minutes.

Cooling of the homogenised ink in a tank set to a temperature of below 30° C. and retention of the ink in said tank to lower its temperature.

The process continues with filling, turning, blowing and marking of the expiry dates.

A second heat treatment is then performed in an autoclave in which a heat treatment is performed to achieve a sterilisation temperature that will ensure the absence of micro-organisms, which in one possible embodiment may be a coefficient of $f_0 \geq 6$. The temperature must be kept above 110° C. for a time that will vary depending on the quantity canned to ensure that the product remains stable throughout the useful life achieved with said treatment.

The temperature and time of the second heat treatment, performed in an autoclave, varies depending on the amount canned.

| Canning weight | Minimum temp. in ° C. of the correct process | Minimum time of the correct heat process | Minimum correct sterilisation value ($F_0$) |
| --- | --- | --- | --- |
| Weight < 90 g | >110° C. | >2 minutes | 6 |
| Weight >= 90 g | >110° C. | >20 minutes | 6 |

Unless otherwise indicated, all technical and scientific elements used in this specification have the meaning habitually understood by a person skilled in the art to which this invention pertains. In the practice of the present invention, similar or equivalent procedures and materials to those described in the specification may be used.

Throughout the description and the claims the word "contains", "comprises" and any variations thereon shall not be intended to exclude other technical characteristics, additives, components or steps. For experts in the field, other objects, advantages and characteristics of the invention will emerge partly from the description and partly from practice with the invention.

DESCRIPTION OF FIGURES

To complete the description made herein and in order better to aid understanding of the characteristics of the invention, according to a preferential example of a practical embodiment thereof, this description is accompanied by a set of drawings showing as follows in indicative, but not limitative terms.

FIG. 1 shows a flow chart of the stages in the procedure.

PREFERRED EMBODIMENT OF THE INVENTION

One form of the preferred embodiment of the proposed invention is described below.

The procedure includes the following stages as described above, which in a preferred embodiment comprises:

Homogenisation and first heat treatment (1) in a reactor to perform pasteurising treatment in which a temperature of at least 70° C. is attained for over 10 minutes.

Cooling (2) of the homogenised ink in a tank set to a temperature of below 30° C. and retention of the ink in said tank to lower its temperature.

The process continues with filling, turning, blowing and marking (3) of the expiry dates.

A second heat treatment (4) is then performed in an autoclave in which a heat treatment is performed to achieve a sterilisation temperature that will ensure the absence of micro-organisms, which in one possible embodiment may be a coefficient of $f_0 \geq 6$. The temperature guaranteed by the treatment must be above 110° C., which ensures that the product remains stable during the useful life provided by said treatment.

Optionally, during the homogenisation process and first heat treatment, a thickener may be added.

The second heat treatment, performed in an autoclave, has a minimum initial temperature and a minimum process temperature and the time varies depending on the quantity canned.

Having sufficiently described the nature of the present invention, and the means of implementing it, it is noted that within the same essence, it may be made in other embodiments differing in detail from that indicated herein as an example, and to which the protection obtained shall equally extend, provided that it does not alter, change or modify its basic principle.

What is claimed:

1. Sterilization process by means of heat treatment for preserving an ink of coleoid cephalopod mollusks, comprising:

homogenizing and first heat treating said ink in a reactor for pasteurizing treatment, wherein said first heat treating is performed at a temperature of at least 70° C. for over 10 minutes;

cooling the homogenized ink in a tank set to a temperature of below 30° C. so as to lower its temperature; and preforming a second heat treating to the cooled homogenized ink, wherein said second heat treating is performed in an autoclave so as to achieve a sterilization temperature that is greater than or equal to 110° C. for a period of between 2-20 minutes or over 20 minutes depending on the quantity of the homogenized ink.

* * * * *